Aug. 22, 1933.   A. VAN DUYN   1,923,853

SLICING MACHINE GUIDE

Filed Jan. 31, 1929

Inventor
Adrianus van Duyn
by Chas. M. Nissen
Attorney

Patented Aug. 22, 1933

1,923,853

UNITED STATES PATENT OFFICE 1,923,853

SLICING MACHINE GUIDE

Adrianus van Duyn, Rotterdam, Netherlands, assignor to U. S. Slicing Machine Company, La Porte, Ind., a Corporation of Indiana Application January 31, 1929, Serial No. 336,521, and in Great Britain February 7, 1928

3 Claims. (Cl. 146—102)

The present invention relates to slicing machines and more particularly to the guides which support the reciprocating carriage found in the type of machine illustrated herein and has for one of its objects the provision of means for compensating for wear in the guiding means.

Another object of this invention is to provide means whereby both the vertical movement of the carriage and the horizontal movement thereof, transversely to the guides, is, in a large measure, prevented.

Another object of this invention is to provide a yielding means for urging a plurality of bearing elements on a reciprocating carriage against opposite sides of a guiding element to insure a more uniform reciprocating movement of the carriage.

Other objects of the invention will appear hereinafter, the novel features and combinations being set forth in the appended claims.

In the drawing:—

Figure 1:
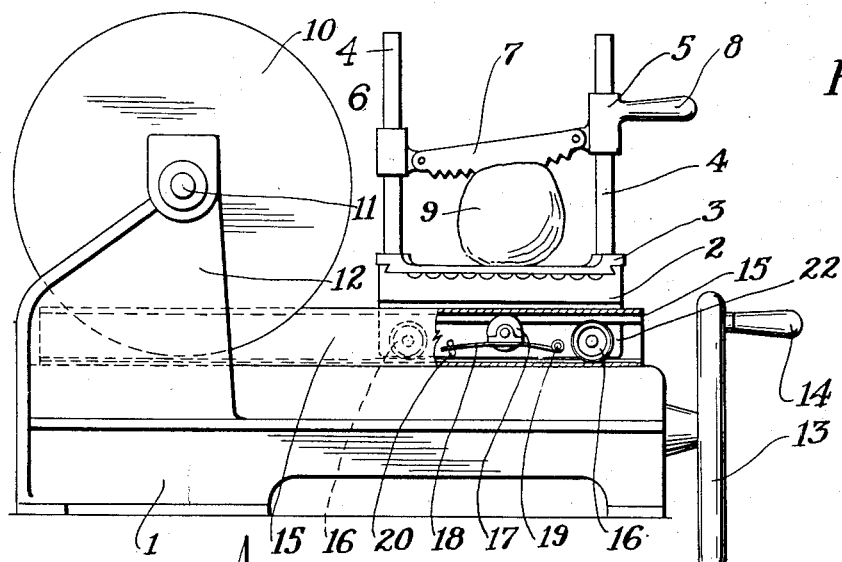
Fig. 1 is a side elevation of a machine embodying my invention with a portion of the guide broken away for the sake of clearness.
Figure 2:
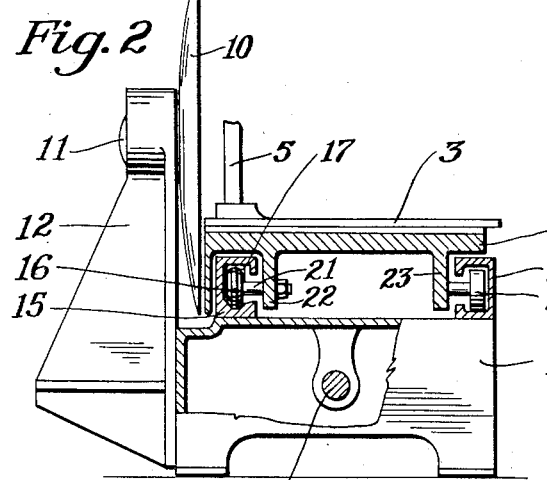
Fig. 2 is a front elevation of the machine with parts thereof in section.

Referring now to Figs. 1 and 2, the machine embodying my invention comprises a base 1 above which there is mounted a carriage 2 for reciprocation along the base. The carriage has a cross slide 3 with upstanding brackets 4 adapted to support the clamping bar 7 by means of bearings 5 and 6 mounted on the upstanding members 4. The bearing 5 carries a handle 8 for exerting pressure on the clamping bar 7 to hold the material 9 to be sliced on the cross slide 3.

10 indicates a slicing knife of the conventional form mounted on a spindle 11 in a bracket 12 adapted to be driven in a well-known manner by gearing driven by the rotation of the shaft 13'. This shaft is rotated as desired by means of the handle 14 on the flywheel 13 fixed to the end of the shaft 13'. The rotation of the shaft 13' also causes the reciprocation of the carriage 2 in a well-known manner such as by a crank and pitman connection driven by gears connected to the shaft 13'.

On one side of the base 1 is mounted a guide 15 which has a substantially V-shaped groove in which the rollers 16 are adapted to travel. These rollers are mounted to rotate on the spindles 21 secured to the bracket 22 on the carriage 2 and carry a portion of the weight of the carriage as it reciprocates. Another guide 25 is mounted on the opposite side of the base member and a roller 24 rotatably mounted on the bracket 23 is adapted to co-operate with this guide to help support the carriage.

To keep the carriage from vertical movement, a spring pressed roller 17 mounted on the spring 18, pivoted at 19 to the flange 22, is used to co-operate with the upper part of the guide 15 to yieldingly urge the carriage downwardly. The roller 17 has a flat face co-operating with a flat surface on the guide but it is to be understood that this shape may be varied to suit the requirements of the particular machine. The free end of the spring 18 is adapted to slide between the pins 20 to permit the spring 18 to flex. Thus, it will be seen that as the carriage is reciprocated, the rollers 17 and 16 are yieldingly urged against opposite sides of the guide 15 in order to stabilize the reciprocating movement of the carriage and prevent upward movement thereof. Lateral movement of the carriage is prevented by the V-shaped construction of the roller 16.

Figure 3:
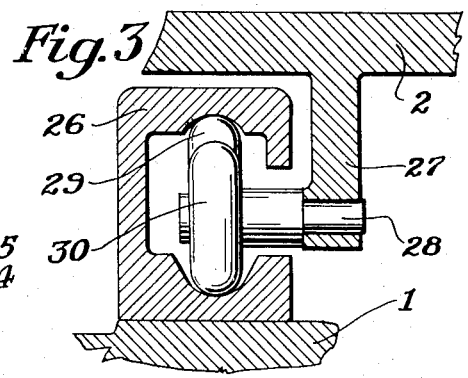
Fig. 3 is a modification of the device as shown in Fig. 1 wherein a different shape is used for the guiding rollers.

In Fig. 3 is shown a slight modification of Figs. 1 and 2 in which the guide 26 is similar to the guide 15 but has substantially arcuate grooves in its upper and lower inner surfaces and the rollers 29 and 30 have faces, the cross sections of which are substantially arcuate and are adapted to co-operate with the guide 26 in the same manner that the rollers 16 and 17 co-operate with the guide 15 in Fig. 1. The rollers 29 and 30 are rotatably mounted upon pins 28 mounted in the bracket 27 corresponding to the bracket 22 shown in Figs. 1 and 2. It will be understood that there are two rollers 30 similar to roller 16 of Fig. 1 and that the roller 29 is yieldingly urged against the upper part of the guide as is the roller 17 in Fig. 1.

Figure 4:
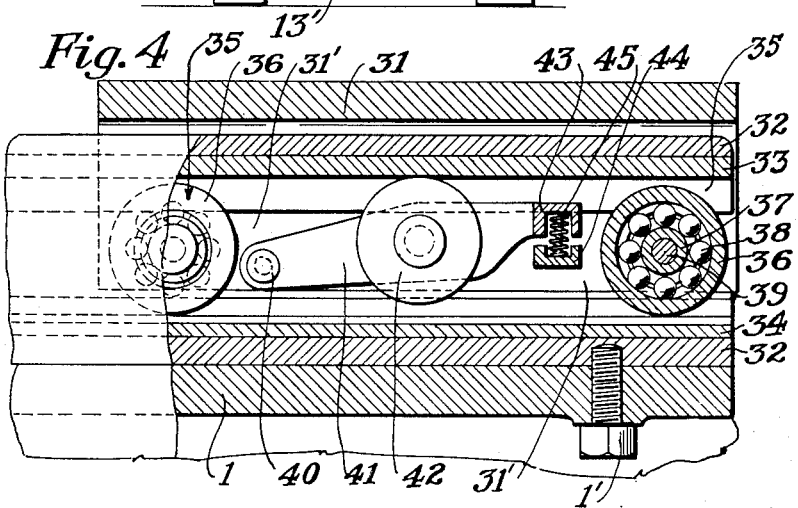
Fig. 4 is a still further modification in which the yieldingly pressed roller is mounted in a slightly different manner than in Fig. 1.
Figure 5:
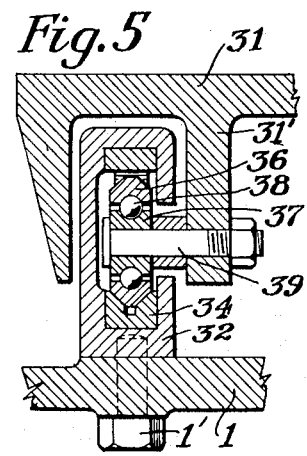
Fig. 5 is a cross section through the center of the roller shown on the right in Fig. 4.

Fig. 4 shows a modification of the device illustrated in Fig. 1 and is a view similar thereto but in this modification, the guide 32 has wearing strips 33 and 34 located so as to form upper and lower guiding surfaces which may be replaced when they become worn; but otherwise the guide 32 performs the same function as the guide 15 in Figs. 1 and 2. Rollers 35 each have a hub portion 37 and an outer rim portion 36 between which are interposed a row of ball bearings to provide for a better operation of the rollers 35. These rollers are mounted on the bolts 39 which clamp the hub portion 37 against the bracket 31' on the carriage 31. The yieldingly pressed roller 42 is rotatably mounted on the lever 41 pivoted at 40 to the bracket 31'. The opposite end of the lever has a recessed portion 43 opposing a similar recessed member 44 on the bracket 31' and a spring 45 is placed with its opposite ends in the said recessed portions so that the roller 42 is yieldingly urged upward against the upper guiding surface 34 and this tends to re-act and hold the rollers 35 against the lower bearing surface 33.

In Figs. 1 to 5, inclusive, the arrangement in each of the modifications comprises a guide with two supporting rollers and a yieldingly pressed roller for co-operation with the guide to prevent vertical and lateral movement of the carriage. A second guide, such as 25, shown in Fig. 2, co-operates with a roller such as 24 to support the opposite side of the carriage.

Obviously, those skilled in the art may make various changes in the details and arrangement of parts without departing from the spirit and scope of the invention as defined by the claims hereto appended, and I therefore do not wish to be restricted to the precise construction herein disclosed.

Having thus fully described and shown an embodiment of my invention, what I claim and desire to secure by Letters Patent of the United States is:—

1. A slicing machine comprising a support, a carriage, a one-piece U-shaped guide on said support, a groove in one arm of the U-shaped member, a roller on said carriage adapted to co-operate with the groove, and yielding means for maintaining said roller in said groove, said yielding means comprising a second roller rotatably mounted on a pivoted lever on said carriage and a spring for urging said lever in a direction to bring the second roller into engagement with the opposite arm of the U-shaped guide.

2. A slicing machine comprising a support, a carriage, a U-shaped guide on said support, a groove in one arm of said U-shaped member, an antifriction roller on said carriage adapted to co-operate with said groove, and yielding means for maintaining said antifriction roller in said groove, said yielding means comprising a second roller rotatably mounted on a pivotal lever on said carriage, and a spring for urging said lever in a direction to bring the second roller into engagement with the opposite arm of the U-shaped guide.

3. A slicing machine comprising a support, a carriage, a one-piece U-shaped guide on said support, a groove in one arm of the U-shaped member, a roller on said carriage adapted to cooperate with the groove, and yielding means for maintaining said roller in said groove, said yielding means comprising a roller mounted on a flat spring for engaging the opposite arm of the U-shaped guide, and said groove and roller having their cooperating surfaces substantially V-shaped in cross section.

ADRIANUS van DUYN.